June 17, 1958 R. LANKES 2,838,889
DEVICE FOR OBSERVING AN OPTICAL MATCHING ACTION
Filed March 9, 1954 2 Sheets-Sheet 1
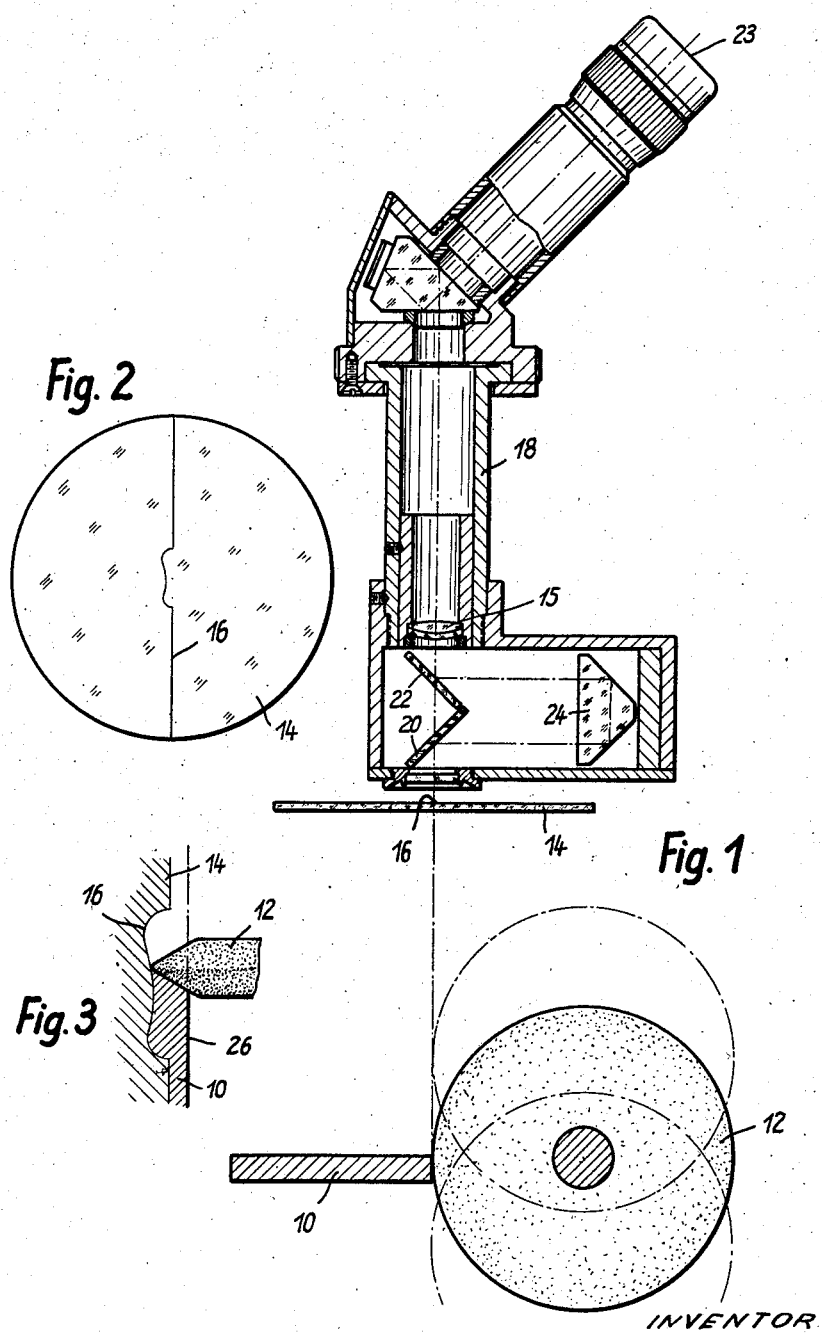
INVENTOR
RICHARD LANKES,
by
John B. Brady
ATTORNEY United States Patent Office 2,838,889
Patented June 17, 1958

2,838,889

DEVICE FOR OBSERVING AN OPTICAL MATCHING ACTION

Richard Lankes, Munich, Germany, assignor to Hans Deckel, Munchen-Solln, Germany, and Friedrich Wilhelm Deckel, Post Tutzing, Germany Application March 9, 1954, Serial No. 415,121

Claims priority, application Germany May 7, 1953

4 Claims. (Cl. 51—165)

The present invention relates to devices of the type surveying the stock-removing or machining action of a tool on a work-piece with the aid of optical observing means having an eyepiece through which both the place at which said machining action occurs and a master or templet showing the desired contour may be observed.

There have already been proposed certain devices of the type indicated in which a first optical system is associated with the place of machining action and a second optical system is associated with the master or templet, the images produced by the two optical systems being viewed through an eyepiece which the two optical systems have in common. However, the use of two optical systems has been found to be disadvantageous in that it renders the necessary equipment more complicated structurally, more expensive and, besides that, inconvenient and cumbersome as regards the adjustment, during use, of individual parts of the said devices.

There have also been known grinding machines of the type in which an image of the machining zone is projected onto a ground-glass screen which latter also shows the desired contour. Apart from the fact that in machines of this type a projection of the machining zone is received, devices of this known type of construction are disadvantageous in that, due to the use of projection equipment, they invariably involve special-type machines of comparatively large size.

The present invention has for one of its objects to eliminate the disadvantages of known devices and to provide an observing device that can be advantageously used as an attachment in combination with certain types of machine tools. The invention provides for the above-stated problem to be solved by incorporating the line or lines representing the desired contour in a master or templet made of any suitable transparent or translucent material and by arranging said master between the machining place and the place of observation in such a manner as to enable both the desired contour and the real images of the machining zone to be observed through a single optical system.

Other objects and advantages of the invention will be apparent from the following description taken in connection with the accompanying drawings. It will be understood that many changes may be made in the details of construction, arrangement of parts and steps of the process without departing from the scope of the invention as expressed in the accompanying claims. I, therefore, do not wish to be limited to the exact details of construction, arrangement of parts, and steps of the process shown and described as the preferred form which has been shown by way of illustration only. Referring to the drawings:

Fig. 1 diagrammatically indicates the arrangement of the optical system of the preferred embodiment;

Figs. 2 and 3 show details of Fig. 1; and

Figure 4:
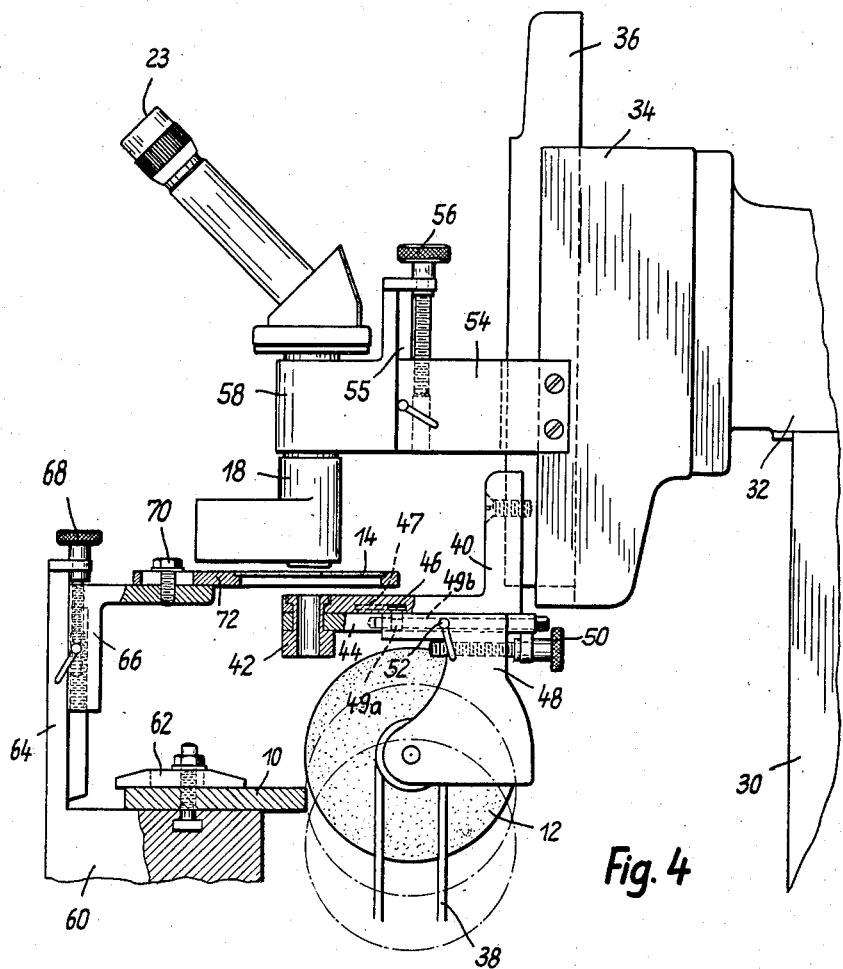
Fig. 4 is an elevational view showing the structure of the preferred embodiment.

In Fig. 1, the work-piece is indicated at 10. It is intended to machine the work-piece 10 by means of a suitable tool, for example a grinding wheel 12, in order to give said work-piece a contour corresponding to the contour of a master 14. For this purpose, the said master in the form of a thin disk is made of a suitable transparent or translucent material such as glass and is made to show the desired contour in the form of an extremely fine line 16. It will be understood that it is thereby possible to arrange the master 14 at a suitable place above the place at which the machining operation of the work-piece occurs and that both these places may thus be observed through a single optical system, preferably through a microscope 18 of known design, containing the objective lens 15 located directly above semi-transparent mirror 22. In order to bring into sharp focus in the image plane the said two places which are located at different levels, two semi-transparent mirrors 20, 22 and a deviating prism 24 are inserted in the path of rays of microscope 18 in such a manner as to cause a first portion of the rays to traverse the mirrors 20, 22 and to reach the eyepiece 23 on the shortest path, and to cause a second portion of the rays to enter the eyepiece only after having passed the deviating prism 24. With this arrangement, the observer will see the superimposed sharply defined images of both the desired contour 16 and the actual contour 26 of the workpiece 10 as shown in Figure 3. It will be appreciated that the use of the device just described tends greatly to simplify the control of machining operations.

It is understood that the superimposition, according to the invention, of the real images of the machining zone and the transparent master, respectively, results in the above-mentioned advantage, i. e. in a simplification of the optical observing system. Moreover, it is possible with this arrangement to provide for the work-piece and the master to be carried by common support permitting the adjustment of the work-piece and master to be changed simultaneously. It is advantageous to mount the microscope and the grinding wheel on a similar common support, it being, of course, necessary also to provide for a reciprocatory motion—required for the desired grinding action—of the grinding wheel, this motion in the present example having to be performed in a vertical direction. It will be appreciated that the grouping of certain parts of the device for simultaneous change of position affords important advantages as regards the control of the machining operation.

Fig. 4 illustrates the structural arrangement of the device according to the invention on a machine tool; moreover, it shows the simple manner in which the device may be used as an attachment for machine tools, thus rendering it possible for such a machine fitted with the device according to the invention to be substituted for an expensive special-type grinding machine, for example a copying grinding machine. This fact is of considerable importance in regard to small and medium-size enterprises in that it tends to provide for greater economy in the use of the machine with which the device according to the invention is combined.

The machine tool partly shown in Fig. 4 may be of the construction available on the market under the trademark "Deckel-FP 1," manufactured by the Friedrich Deckel firm in Munich, Germany, such machines being well known and widely distributed in the United States for many years past.

The column 30 of said machine tool is fitted with a horizontally adjustable spindle head 32 which carries, for example, a detachable vertical slotting or shaping attachment 34. The slotting attachment comprises a vertically reciprocable sliding member 36 to which normally a slotting tool is attached. In the present example, however, the sliding member carries instead a grinding wheel 12 which is driven through a belt 38 by a suitable source of power (not shown). Thus, any vertical reciprocation of the slide 36 will cause the grinding wheel 12 to be also reciprocated vertically past the work-piece 10.

The axis of rotation of the grinding wheel 12 carried by the slide 36 may be adjusted in a horizontal direction and may also be tilted. For this purpose, the slide 36 carries a bracket 40 into which is fitted at a point approximately vertically above the machining place a hollow pivot 42.

A pivoting member 44 is mounted for rotation about the pivot 42 and may be locked in position by means of a clamping nut bolt 46 carried in the pivoting member 44 and sliding with its nut-head in a T-slot 47 in the bracket 40, said T-slot 47 being arcuately located about the hollow pin 42. The clamping movement of said nut bolt 46 in its axial direction is effected by means of an eccentric cam 49a provided on an actuating spindle 49b rotatably mounted in said pivoting member 44. The pivoting member 44 has mounted on it a slide-like bearing bracket 48 which may be adjusted with respect to the member 44 by means of an adjusting screw 50 and immobilized by means of a clamp 52. Swinging of the pivoting member 44 about the pivot 42 serves to set the grinding wheel 12 at the desired horizontal angle, and displacing the bearing bracket 48 by means of the adjusting screw 50 serves to obtain horizontal fine adjustment of the grinding wheel in relation to the work-piece 10.

Attached to the stationary head-part of the slotting attachment 34 is a carrier member 54 which straddles the movable slide 36 in order not to interfere with the latter's movements. A bracket 58 is mounted on the vertical guide 55 of the carrier 54 and adjusted by means of an adjusting screw 56 serving to support the microscope 18.

The work table of the machine tool (not shown) supports a base 60 to which the work-piece is clamped by means of a suitable number of clamping strips 62. The base 60 comprises a vertically upwardly extending arm 64 carrying an angle member or support 66 which may be adjusted vertically with the aid of an adjusting screw 68. The support 66, in turn, serves to support an annular mount 72 for the master 14, a screw 70 being provided for the purpose of adjusting and locking the said mount.

In the course of machining the work-piece 10 by the grinding wheel 12 it is possible, by virtue of the advantageous design of the device according to the invention, to obtain the relative horizontal feed motion between the work-piece and the grinding wheel either by changing the horizontal position of the base 60 mounted on the work table of the machine and supporting the work-piece 10 and the master 14 or by changing the horizontal position of the spindle head 32 carrying the grinding wheel 12 and the microscope 18. As an alternative it is possible to combine the changes in horizontal position just mentioned, in which case, however, care will always have to be taken to keep the contour line of the master within the observation-field of the optical system. Since the ranges of horizontal adjustment of the work table of the machine and the spindle head, respectively, substantially exceed the largest dimension of the machined contour, the entire machining operation may be performed without any change in the relative position of the master with respect to the work-piece being necessary, this fact ensuring satisfactory results of the said machining operation.

While I have described one of the preferred embodiments of my invention I realize that modifications may be made and I desire that it is understood that no limitations upon my invention are intended other than may be imposed by the scope of the appended claims.

What I claim is:

1. In a machine tool, in combination, a machine column, a spindle head mounted for horizontal adjusting movements on said machine column, an attachment on said spindle head, a sliding member in said attachment permitting vertically reciprocating movements, a work-table adjustably mounted on said machine column and adapted to support a work-piece, a support attached to the work-table, a master of translucent material mounted on the support, any adjustment of said work-table effecting like and common displacements of the master and the work-piece, contour lines provided on said translucent master, a driven tool mounted on said reciprocating sliding member and engaging said work-piece for machining action, a single optical observing system with an eye-piece adjustably carried by said attachment, any adjustment of said spindle head effecting like and common displacements of the single optical observing system and the driven tool, said translucent master being located between the single optical observing system and the machining position of the work-piece, whereby the real images of the machining position of the work-piece and the desired contour line on said master may be conjointly observed through the eyepiece of said single optical observing system.

2. A machine tool having a device for simultaneously observing the real images of the machining action of a tool on a work-piece and of a template showing the desired form of the work-piece, comprising in combination, an optical observing system with a single eye-piece and a single objective lens, a master of translucent material having contour lines thereon, a base member adapted to support a work-piece, a rotatably driven machining tool in operative engagement with said work-piece, said translucent master being located between the optical observing system and the machining position of the work-piece, and optical means for providing an elongated optical path along with the normal optical path in-between the work-piece and master for producing sharp focus of the real image of said work-piece and master through the eye-piece of the optical observing system.

3. A machine tool having a device for simultaneously observing the real images of the machining action of a tool on a work-piece and of a template showing the desired form of the work-piece, as set forth in claim 2, in which the master and the work-piece are adjustably mounted on the base member, and wherein a displacement of said base member effects like and common displacements of the master and the work-piece, and in which the optical observing system and the driven tool are adjustably mounted on a carrier member and wherein displacement of said carrier member effects like and common displacements of the optical observing system and the driven tool.

4. A machine tool having a device for simultaneously observing the real images of the machining action of a tool on a work-piece and of a template showing the desired form of the work-piece, as set forth in claim 3, and in which the rotatably driven machining tool is mounted for reciprocal movements in relation to said carrier member.

References Cited in the file of this patent

UNITED STATES PATENTS

| | | |
|---|---|---|
| 1,474,321 | De Mattia | Nov. 13, 1923 |
| 2,164,169 | Wohlfarth | June 27, 1939 |
| 2,197,308 | Kolb et al. | Apr. 16, 1940 |
| 2,404,770 | Bennett et al. | July 30, 1946 |
| 2,412,017 | Taylor et al. | Dec. 3, 1946 |
| 2,553,099 | Lowber et al. | May 15, 1951 |
| 2,729,036 | Franke et al. | Jan. 3, 1956 |